United States Patent
Soldati et al.

(10) Patent No.: US 10,499,373 B2
(45) Date of Patent: *Dec. 3, 2019

(54) FIRST AND SECOND NETWORK NODES AND METHODS THEREOF

(71) Applicant: Huawei Technologies Co., Ltd., Shenzhen (CN)

(72) Inventors: Pablo Soldati, Kista (SE); George Koudouridis, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

This patent is subject to a terminal disclaimer.

(21) Appl. No.: 15/647,970

(22) Filed: Jul. 12, 2017

(65) Prior Publication Data

US 2017/0311295 A1 Oct. 26, 2017

Related U.S. Application Data

(63) Continuation of application No. PCT/EP2015/050429, filed on Jan. 12, 2015.

(51) Int. Cl.
*H04W 74/04* (2009.01)
*H04W 72/04* (2009.01)
*H04W 16/10* (2009.01)
*H04W 88/08* (2009.01)

(52) U.S. Cl.
CPC .......... *H04W 72/04* (2013.01); *H04W 16/10* (2013.01); *H04W 72/0453* (2013.01); *H04W 88/085* (2013.01)

(58) Field of Classification Search
CPC . H04W 16/10; H04W 72/04; H04W 72/0453; H04W 88/085
See application file for complete search history.

(56) References Cited

U.S. PATENT DOCUMENTS

| | | | |
|---|---|---|---|
| 10,178,557 B2* | 1/2019 | Soldati | H04W 16/14 |
| 2006/0083205 A1* | 4/2006 | Buddhikot | H04W 16/14 |
| | | | 370/338 |
| 2010/0118812 A1* | 5/2010 | Kim | H04W 72/082 |
| | | | 370/329 |

(Continued)

FOREIGN PATENT DOCUMENTS

| | | |
|---|---|---|
| CN | 101969696 A | 2/2011 |
| CN | 101977159 A | 2/2011 |
| WO | 2014194927 A1 | 12/2014 |

*Primary Examiner* — Benjamin H Elliott, IV
(74) *Attorney, Agent, or Firm* — Leydig, Voit & Mayer, Ltd.

(57) ABSTRACT

The present disclosure relates to a first network node and a second network node. The first network node comprises: a processor and a transceiver, wherein the transceiver is configured to receive a first signal comprising a network information message indicating network information associated with a region (R) or with at least one sub-region (SR) of the region (R); wherein the processor is configured to determine a density of network nodes for operation $\lambda_b$ in the region (R) or in the sub-region (SR) based on the network information. Furthermore, the present disclosure also relates to corresponding methods, a computer program, and a computer program product.

17 Claims, 5 Drawing Sheets

(56) References Cited

U.S. PATENT DOCUMENTS

| | | | |
|---|---|---|---|
| 2013/0128761 A1* | 5/2013 | Kang | H04W 72/046 |
| | | | 370/252 |
| 2013/0295926 A1 | 11/2013 | Michel et al. | |
| 2015/0245341 A1* | 8/2015 | Grant | H04B 7/18539 |
| | | | 370/336 |
| 2016/0007363 A1* | 1/2016 | Hahn | H04W 72/04 |
| | | | 370/252 |
| 2017/0295579 A1* | 10/2017 | Sheng | H04W 72/02 |
| 2017/0311295 A1* | 10/2017 | Soldati | H04W 16/10 |
| 2017/0359731 A1* | 12/2017 | Soldati | H04W 16/14 |

* cited by examiner

FIRST AND SECOND NETWORK NODES AND METHODS THEREOF

CROSS-REFERENCE TO RELATED APPLICATIONS

This application is a continuation of International Application No. PCT/EP2015/050429, filed on Jan. 12, 2015, the disclosure of which is hereby incorporated by reference in its entirety.

TECHNICAL FIELD

The present disclosure relates to a first network node and a second network node. Furthermore, the present disclosure also relates to corresponding methods, a computer program, and a computer program product.

BACKGROUND

One of the main envisaged means to increase a cellular network's capacity significantly beyond 4G's capabilities is by densification of the radio access network (RAN). Essentially, densification of the network's infrastructure brings the network access points closer to the end user. A denser radio access network infrastructure implies an average lower path loss, thereby yielding a better link budget, and an average lower number of users served by each access point. Such densification is widely believed to bring substantial gains in network data throughputs (it has already done so in the past decades), but also to help reducing the networks' energy consumption. The related art 3GPP standards organization has already started to look into the integration of denser small-cell deployments within the current 4th generation of cellular architecture, the Long Term Evolution (LTE) system.

A second key feature of future radio access technologies is flexible usage of frequency spectrum, with a typical network node supporting not only a potentially new 5G standard operating in new frequency bands (e.g., at mmWave frequencies), but also capable of integrating different radio access technologies (RATs) operating at different frequency bands, such as numerous releases of the 4G LTE standard, a variety of WiFi, etc. Therefore, spectrum flexibility may bring benefits in terms of increased data rate (e.g., when multiple spectrum bands are aggregated), but also benefits in terms of efficient spectrum usage and interference mitigation (e.g., when frequency bands are entirely or partially released by lightly loaded access nodes). To fully capitalize these benefits, however, new resource management algorithms should exploit the inherent couplings between RAN densification and dynamic spectrum allocation.

Traditional communication systems' network nodes, such as base stations in 2G-4G radio cellular systems, are designed to operate within certain frequency spectrum bands with a fixed transmission power output, regardless of the time-variations of traffic demand and user mobility patterns. In more advanced 4G systems, such as the 3GPP LTE-A, carrier aggregation mechanisms have been introduced to support higher peak data rate for the system users. Carrier aggregation allows a base station of the system to activate/deactivate frequency carriers in a fast time-scale depending on the data rate and traffic requirements of the users.

The optimization of access node placement in an area and their configuration in terms of transmission power output, spectrum/frequency allocation, etc. is also known as network planning. The aim of network planning is to primarily guarantee network coverage and capacity based on average traffic derived from population and geographical maps along with driving tests prior to a network operation. To increase capacity at user dense areas, hierarchical network planning is used which implies multi-tier networks where each tier consists of a different type of access node with different transmit power and coverage characteristics.

The configuration the spectrum band(s) where each network node shall operate is often referred to as frequency re-use planning. Typically, the frequency band is globally assigned to the entire network (1 frequency reuse case). However, when network nodes utilize the entire frequency band with uniform power distributed across the available bandwidth, they create strong interference to cell edge users of neighbouring network nodes. More advanced forms of frequency reuse have been envisaged to remedy this, including fractional frequency reuse and soft frequency reuse. All these approaches introduce a method where spectrum resources are divided so as interference between networks nodes is reduced to a minimum.

A general drawback of conventional techniques with statically or semi-statically radio resource assigned to system entities is that an excess of resources (e.g., frequency bandwidth) may be provided to lowly-loaded access nodes, thereby creating unnecessary interference to other access nodes, or, vice versa, insufficient resources be provided to highly loaded access nodes. An additional general drawback of radio resource management (RRM) of conventional solutions is that it is traditionally dimensioned and rigidly designed for sparse deployments of network nodes (e.g., base stations, access points, etc.). As such, these techniques cannot handle the complexity of radio resource management in ultra-dense radio access networks with hundreds of network nodes deployed in close proximity, nor provide the degree of flexibility in the radio resource allocation that is required in such networks to assure an efficient network operation.

SUMMARY

An objective of embodiments of the present disclosure is to provide a solution which mitigates or solves the drawbacks and problems of conventional solutions.

An "or" in this description and the corresponding claims is to be understood as a mathematical OR which covers "and" and "or", and is not to be understand as an XOR (exclusive OR).

The above objectives are solved by the subject matter of the independent claims. Further advantageous implementation forms of the present disclosure can be found in the dependent claims.

According to a first aspect of the disclosure, the above mentioned and other objectives are achieved with a first network node for a wireless communication system, the first network node comprising:

a processor; and a transceiver;

wherein the transceiver is configured to receive a first signal comprising a network information message indicating network information associated with a region or with at least one sub-region of the region;

wherein the processor is configured to determine a density of network nodes for operation $\lambda_b$ in the region or in the sub-region based on the network information; and wherein the transceiver further is configured to transmit a second signal to one or more second network nodes associated with the region or with the sub-region, the second signal comprising a first network resource allocation message indicating the density of network nodes for operation $\lambda_b$.

A region or a sub-region in this disclosure should be understood as a geographical area wherein network nodes of the wireless communication system are deployed. The deployment of network nodes can be represented by a density of network nodes expressing, for instance, the number of network nodes per unit area present in a region or sub-region of the wireless communication system.

Further, the expression "for operation" used in this disclosure in relation to an allocation of network resources should be understood as network resources allocated for the operation of network nodes in a wireless communication system. In this regard, the density of network nodes for operation $\lambda_b$ represents number of network nodes per unit area that the wireless communication system is configured to operate with in a region or sub-region. Similarly, an allocation of frequency resources for operation represents a set of frequency resources that network nodes in a region or sub-region of the wireless communication systems are configured to operate with to serve the system user devices.

A network node in this disclosure may denote a network control node or an access node or a combination thereof. The network nodes may communicate with each other and with other communication devices in a wireless manner through air-interfaces and/or a wired manner with wired connections. Examples of access nodes are Access Point (APs), Radio Base Station (RBS) or Base Transceiver Station (BTS), remote radio head, small-cell node, pico-cell node, femto-cell node, et. Examples of control nodes are Radio Network Controller (RNC), Operation Administration and Maintenance (OAM), Mobility Management Entity (MME), Network Resource Scheduler (NRS) entity, Radio Base Station (RBS) or Base Transceiver Station (BTS), which in some networks may be referred to as "eNB", "eNodeB", "NodeB" or "B node", depending on the technology and/or terminology used.

Further, the expression "operational state" in this disclosure should be understood as one or more operational modes that can be configured for a network node. One example of an operational state is a dormant mode (e.g. an OFF-state), wherein a network node has some transmission or reception functionalities partially or fully disabled. A second example of operational state is an active mode (e.g., ON-state), wherein a network node is configured to operate with full transmission and reception capabilities. A third example of an operational state is reducing the transceiver duty cycle while in active mode by means of Discontinuous Reception (DRX) or Discontinuous Transmission (DTX) which define time periods when the receiver or the transmitter of the transceiver respectively can be turned off. An operational state may further refer to a state where a network node is configured to operate as a network control node for a region or a sub-region of the wireless communication system. For example, an access node being configured to control or coordinate the operation or radio resource allocation of other access nodes. Additionally, an operational state can refer to a transmission mode configurable for the network node, such as single-input-single-output (SISO) transmission, multiple-input-multiple-output (MIMO) transmission, multi-user MIMO transmission, massive MIMO transmission, Frequency Duplex Division (FDD), Time Duplex Division (TDD), Frequency Full Duplex, etc. The related art LTE system offers, for instance, ten different transmission modes. An operational state can further refer to one or more radio access technologies that the network node may be configured to operate with, such as numerous releases of the related art LTE system, several types of WiFi, device-to-device, etc. An operational state can additionally refer to a set of frequency resources that a network node can be configured to operate with, such as different frequency bands, component carriers, etc. An operational state can finally refer to communications features configurable for a network node, such as cooperative communication (e.g., coordinated multipoint, CoMP), numerous types of interference coordination mechanisms, traffic adaptation mechanisms, etc.

A first network node configured to determine a density of network nodes for operation $\lambda_b$ in the region or in the sub-region based on the network information and further configured to transmit the second signal comprising the first network resource allocation message to second network nodes provides a number of advantages over conventional solutions.

An advantage of the present first network node is to minimize the number of network nodes utilized in a region or a sub-region of a network to satisfy the traffic demand or quality of service in the region or sub-region, thereby e.g. enabling: minimization of operational costs; energy savings; reduction of interference to neighbouring areas. Therefore, the present first network node enables to dynamically reconfigure the allocation and utilization of network resources to network nodes by adapting to time- and spatial changes in traffic patterns, service demands, user mobility patterns, etc. The present first network node further enables to optimize the efficiency of the wireless communication system thereby reducing the associated operational costs (OPEX).

In a first possible implementation form of a first network node according to the first aspect, the processor further is configured to determine an operational state for the one or more second network nodes based on the density of network nodes for operation $\lambda_b$; and wherein the first network resource allocation message further indicates the operational state for the one or more second network nodes.

An advantage with this implementation form is that since the operational state is determined by the first network node, the one or more second network nodes do not have to make the determination of the operational state. Thereby, a more centralized solution is provided which e.g. implies faster adaptation at the second network nodes, reduced computational capabilities needed in the second network nodes meaning less complex and cheaper second network nodes.

In a second possible implementation form of a first network node according to the first implementation form of the first aspect or the first network node as such, the network information is one or more network traffic information or network environment information in the group comprising: traffic load, traffic demand, average traffic load or traffic demand, peak traffic load or traffic demand, time distribution of traffic load or traffic demand, spatial distribution of traffic load or traffic demand, user device density, active user device density, traffic demand of active user devices, available density of network nodes, available frequency spectrum resources at network nodes, and an estimate of a radio propagation loss exponent.

An advantage with this implementation form is to enable a network node to control the utilization of the network infrastructure and the corresponding radio resources in different regions or sub-regions in the wireless communication systems based on the corresponding traffic load or traffic demand. Therefore, sub-regions with lower traffic intensity can be served by fewer network nodes, whereas sub-regions with higher traffic intensity or higher user device density can be served by more network nodes.

In a third possible implementation form of a first network node according to the second implementation form of the first aspect, the network information further is one or more in the group comprising: aggregate or average user device rate performance, average service delivery delay to or from user devices, average packet or average block error rate, hybrid automatic repeat request or automatic repeat request retransmission attempts, change in user device traffic demand, and user device performance metric.

An advantage with this implementation form is to enable fast and dynamic adjustments of the number of networks nodes and the frequency resources, such as the frequency bandwidth, utilized by network nodes in a region of the wireless communication system.

In a fourth possible implementation form of a first network node according to any of the preceding implementation forms of the first aspect or the first network node as such, the processor further is configured to determine a first allocation of frequency resources for operation $W_1$ in the region or in the sub-region based on the network information; and wherein the first network resource allocation message further indicates the first allocation of frequency resources for operation $W_1$.

An advantage with this implementation form is to enable a refined allocation of number of network nodes, and the corresponding allocation of frequency resources, for operation in different regions or sub-regions in the wireless communication systems. Therefore, sub-regions with lower traffic intensity can be served by fewer network nodes or smaller amount of spectrum, whereas sub-regions with higher traffic intensity or higher user device density can be served by more network nodes or more frequency bandwidth. An additional advantage with this implementation form is that the second network nodes do not have to determine first allocation of frequency resources for operation $W_1$ implying a centralized solution in this respect. Hence, faster frequency adaptation at the second network nodes is possible. Also reduced computational capabilities are needed in the second network nodes meaning less complex and cheaper second network nodes. Further, interference between the second network nodes can be reduced since the frequency use and/or re-use can be easier and more efficient coordinated with this solution.

In a fifth possible implementation form of a first network node according to the fourth implementation form of the first aspect, the first allocation of frequency resources for operation $W_1$ indicates one or more in the group comprising: amount of frequency bandwidth, frequency location of frequency bandwidth, a set of time-frequency resource blocks, one or more frequency bands, instruction to increase or decrease frequency bandwidth, and instruction to increase or decrease frequency bandwidth by a predefined amount.

An advantage with this implementation form is to enable fast and dynamic adjustments of the frequency resources, such as the frequency bandwidth, utilized by second network nodes in a region or sub-region of the wireless communication system.

In a sixth possible implementation form of a first network node according to any of the preceding implementation forms of the first aspect or the first network node as such, the processor further is configured to partition the region into $K \geq 1$ number of sub-regions based on the network information so as to determine partitioning information; and wherein the second signal further comprises a partitioning message indicating the partitioning information.

An advantage with this implementation form is to increase the scalability and reduce the computational complexity of the network resource allocation to network nodes when the system comprises a massive number of access points and user devices.

In a seventh possible implementation form of a first network node according to the fifth or the sixth implementation form of the first aspect, the partitioning information is one or more in the group comprising: identities of network nodes belonging to a sub-region, identities of user devices served in a sub-region, type of traffic served in a sub-region, spatial distribution of traffic served in a sub-region, spatial distribution of user devices in a sub-region, user device density in a sub-region, active user device density in a sub-region, traffic demand of active user devices in a sub-region, available network node density in a sub-region, and available frequency spectrum at network nodes in a sub-region.

An advantage with this implementation form is to enable an efficient operation in the sub-region. Additionally, the first network node may exploit this information to instruct a second network node in the considered sub-region to be a network control node (as a first network node) for the sub-region, thereby increasing scalability and reducing the complexity of the resource allocation in the region and sub-regions.

In an eight possible implementation form of a first network node according to any of the preceding implementation forms of the first aspect or the first network node as such, the density of network nodes for operation $\lambda_b$ is given in number of network nodes per area unit.

An advantage with this implementation form is that the density of network nodes for operation $\lambda_b$ per area unit is a very convenient way of representing and is also suitable when adapting the operation of the second network nodes.

According to a second aspect of the disclosure, the above mentioned and other objectives are achieved with a second network node for a wireless communication system, the second network node comprising:

a processor; and a transceiver;

wherein the transceiver is configured to receive a second signal from a first network node, the second signal comprising a first network resource allocation message indicating a density of network nodes for operation $\lambda_b$ in a region or in at least one sub-region of the region;

wherein the processor is configured to control an operational state of the second network node in the region or in the sub-region based on the first network resource allocation message or to determine an operational state for one or more other second network nodes in the region or in the sub-region based on the first network resource allocation message; and wherein the transceiver further is configured to transmit a third signal to the one or more other second network nodes, the third signal comprising a second network resource allocation message indicating the operational state for the one or more other second network nodes and the density of network nodes for operation $\lambda_b$.

It should be noted that the transceiver of the second network node is configured to transmit the third signal to the other second network nodes if the processor previously has determined an operational state for one or more other second network nodes.

A second network node configured to receive the second signal comprising the first network resource allocation message and control the operational state of the second network node or other second network nodes provides a number of advantages over conventional solutions.

An advantage of the present second network node is to minimize the number of network nodes as well as the frequency spectrum bandwidth utilized in a region or a sub-region of a network to satisfy the traffic demand or quality of service in the region or sub-region, thereby e.g. enabling: minimization of operational costs; energy savings; reduction of interference to neighbouring areas. Therefore, the present second network node enables to dynamically reconfigure the allocation and utilization of network resources to network nodes by adapting to time- and spatial changes in traffic patterns, service demands, user mobility patterns, etc.

In a first possible implementation form of a second network node according to the second aspect, the first network resource allocation message further indicates a first allocation of frequency resources for operation $W_1$ in the region or in the sub-region, and wherein the transceiver further is configured to operate according to the first allocation of frequency resources for operation $W_1$.

An advantage with this implementation form is that the second network node can be dynamically reconfigured to operate with different frequency resources, such as frequency bands, set of time-frequency resource blocks, frequency spectrum bandwidth, etc., depending on the traffic demand or traffic load in the region or sub-region. This enables to optimize the operation of second network nodes in a region or sub-region, thereby reducing interference, reducing energy costs, and enhancing spectral efficiency. Hence, faster frequency adaptation at the second network nodes is possible. Also reduced computational capabilities are needed in the second network nodes meaning less complex and cheaper second network nodes. Further, interference between the other second network nodes can be reduced since the frequency use and/or re-use can be more efficiently coordinated with this semi-centralized solution.

In a second possible implementation form of a second network node according to the first implementation form of the second aspect, the processor further is configured to determine a second allocation of frequency resources for operation $W_2$ in the region or in the sub-region based on the first allocation of frequency resources for operation $W_1$ and on network traffic information or network environment information; and wherein the second network resource allocation message further indicates the second frequency allocation for operation $W_2$.

An advantage with this implementation form is that the other second network nodes do not have to determine second allocation of frequency resources for operation $W_2$ implying a semi-centralized solution in this respect. Hence, faster frequency adaptation at the other second network nodes is possible with high performance due to the use of the network traffic information or the network environment information. Also reduced computational capabilities are needed in the second network nodes meaning less complex and cheaper second network nodes. Further, interference between the other second network nodes can be reduced since the frequency use can be easier coordinated with this centralized solution.

In a second possible implementation form of a second network node according to the second implementation form of the second aspect, the second allocation of frequency resources for operation $W_2$ indicates one or more in the group comprising: amount of frequency bandwidth, frequency location of frequency bandwidth, a set of time-frequency resource blocks, one or more frequency bands, instruction to increase or decrease frequency bandwidth, and instruction to increase or decrease frequency bandwidth by a predefined amount.

An advantage with this implementation form is to enable fast and dynamic adjustments of the frequency resources, such as the frequency bandwidth, utilized by second network nodes in a region or sub-region of the wireless communication system.

In a third possible implementation form of a second network node according to any of the preceding implementation forms of the second aspect or to the second network node as such, the transceiver further is configured to transmit a first signal to the first network node, the first signal comprising a network information message indicating network information associated with the region or with the sub-region.

An advantage with this implementation form is that the network information, such as network traffic information and network environment information, available at the second network nodes (e.g., the radio network nodes of a wireless communication system) can be collected at the first network node (e.g., a network control node) so as to optimize the allocation of frequency resources to second network nodes in a region or sub-region, as well as to optimize the density of network nodes for operation in a region or a sub-region. This enables efficient utilization of the radio resources available in the wireless communication system, mitigation of interference, and reduction of operational costs of the system.

In a fourth possible implementation form of a second network node according to any of the preceding implementation forms of the second aspect or to the second network node as such, the density of network nodes for operation $\lambda_b$ is given in number of network nodes per area unit.

An advantage with this implementation form is that the density of network nodes for operation $\lambda_b$ per area unit is a very convenient way of representing and is also suitable when adapting the operation of the second network nodes.

According to a third aspect of the disclosure, the above mentioned and other objectives are achieved with a method in a first network node for a wireless communication system, the method comprising receiving a first signal comprising a network information message indicating network information associated with a region or with at least one sub-region of the region;

determining a density of network nodes for operation $\lambda_b$ in the region or in the sub-region based on the network information;

transmitting a second signal to one or more second network nodes associated with the region or with the sub-region, the second signal comprising a first network resource allocation message indicating the density of network nodes for operation $\lambda_b$.

In a first possible implementation form of a method according to the third aspect, the method further comprises determining an operational state for the one or more second network nodes based on the density of network nodes for operation $\lambda_b$; and wherein the first network resource allocation message further indicates the operational state for the one or more second network nodes.

In a second possible implementation form of a method according to the first implementation form of the third aspect or the method as such, the network information is one or more network traffic information or network environment information in the group comprising: traffic load, traffic demand, average traffic load or traffic demand, peak traffic load or traffic demand, time distribution of traffic load or traffic demand, spatial distribution of traffic load or traffic demand, user device density, active user device density, traffic demand of active user devices, available density of network nodes, available frequency spectrum resources at network nodes, and an estimate of a radio propagation loss exponent.

In a third possible implementation form of a method according to the second implementation form of the third aspect, the network information further is one or more in the group comprising: aggregate or average user device rate performance, average service delivery delay to or from user devices, average packet or average block error rate, hybrid automatic repeat request or automatic repeat request retransmission attempts, change in user device traffic demand, and user device performance metric.

In a fourth possible implementation form of a method according to any of the preceding implementation forms of the third aspect or the method as such, the method further comprises determining a first allocation of frequency resources for operation $W_1$ in the region or in the sub-region based on the network information; and wherein the first network resource allocation message further indicates the first allocation of frequency resources for operation $W_1$.

In a fifth possible implementation form of a method according to the fourth implementation form of the third aspect, the first allocation of frequency resources for operation $W_1$ indicates one or more in the group comprising: amount of frequency bandwidth, frequency location of frequency bandwidth, a set of time-frequency resource blocks, one or more frequency bands, instruction to increase or decrease frequency bandwidth, and instruction to increase or decrease frequency bandwidth by a predefined amount.

In a sixth possible implementation form of a method according to any of the preceding implementation forms of the third aspect or the method as such, the method further comprises partitioning the region into K≥1 number of sub-regions based on the network information so as to determine partitioning information; and wherein the second signal further comprises a partitioning message indicating the partitioning information.

In a seventh possible implementation form of a method according to the fifth or the sixth implementation form of the third aspect, the partitioning information is one or more in the group comprising: identities of network nodes belonging to a sub-region, identities of user devices served in a sub-region, type of traffic served in a sub-region, spatial distribution of traffic served in a sub-region, spatial distribution of user devices in a sub-region, user device density in a sub-region, active user device density in a sub-region, traffic demand of active user devices in a sub-region, available network node density in a sub-region, and available frequency spectrum at network nodes in a sub-region.

In an eight possible implementation form of method according to any of the preceding implementation forms of the third aspect or the first network node as such, the density of network nodes for operation $\lambda_b$ is given in number of network nodes per area unit.

According to a fourth aspect of the disclosure, the above mentioned and other objectives are achieved with a method in a second network node for a wireless communication system, the method comprising receiving a second signal from a first network node, the second signal comprising a first network resource allocation message indicating a density of network nodes for operation $\lambda_b$ in a region or in at least one sub-region of the region;

controlling an operational state of the second network node (300) based on the first network resource allocation message; or determining an operational state for one or more other second network nodes in the region or in the sub-region based on the first network resource allocation message, and transmitting a third signal to the one or more other second network nodes, the third signal comprising a second network resource allocation message indicating the operational state for the one or more other second network nodes and the density of network nodes for operation $\lambda_b$.

In a first possible implementation form of method according to the fourth aspect, the first network resource allocation message further indicates a first allocation of frequency resources for operation $W_1$ in the region or in the sub-region, and the method further comprises operating according to the first allocation of frequency resources for operation $W_1$.

In a second possible implementation form of method according to the first implementation form of the fourth aspect, the method further comprises determining a second allocation of frequency resources for operation $W_2$ in the region or in the sub-region based on the first allocation of frequency resources for operation $W_1$ and on network traffic information or network environment information; and wherein the second network resource allocation message further indicates the second frequency allocation for operation $W_2$.

In a second possible implementation form of method according to the second implementation form of the fourth aspect, the second allocation of frequency resources for operation $W_2$ indicates one or more in the group comprising: amount of frequency bandwidth, frequency location of frequency bandwidth, a set of time-frequency resource blocks, one or more frequency bands, instruction to increase or decrease frequency bandwidth, and instruction to increase or decrease frequency bandwidth by a predefined amount.

In a third possible implementation form of method according to any of the preceding implementation forms of the fourth aspect or to the method as such, the method further comprises transmitting a first signal to the first network node, the first signal comprising a network information message indicating network information associated with the region or with the sub-region.

In a fourth possible implementation form of method according to any of the preceding implementation forms of the fourth aspect or to the method as such, the density of network nodes for operation $\lambda_b$ is given in number of network nodes per area unit.

The advantages of the methods according to the third aspect or the fourth aspect are the same as those for the corresponding device claims according to the first and second aspects.

The present disclosure also relates to a computer program, characterized in code means, which when run by processing means causes said processing means to execute any method according to the present disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present disclosure will be apparent from the following detailed description.

BRIEF DESCRIPTION OF THE DRAWINGS

The appended drawings are intended to clarify and explain different embodiments of the present disclosure, in which.

DETAILED DESCRIPTION

While the configuration of the network resources for network nodes in a wireless cellular system is typically static, the way some network resources are used by the network nodes to serve the system user devices (such as User Equipments, UEs, in LTE systems) can be very dynamic. For instance, the related art LTE system can schedule user devices in frequency domain on a millisecond time-scale, provide methods for interference mitigation, as well as methods for coordinating the transmission and reception among multiple network nodes. Nevertheless, the operation of a network node is burdened to the bandwidth modes and power output that are statically configured and optimized to enable efficiency in a cell rather than network-wide.

In addition, conventional wireless communication systems do not provide the necessary means, such as, signalling, feedback and algorithms, to support dynamic configuration or reconfiguration of radio network resources to network nodes in ultra-dense network deployments so as to follow changes in traffic demands, user device mobility etc. In this regard, carrier aggregation cannot be seen as a dynamic reconfiguration of radio resources of the system entities (e.g., network nodes), but rather as a mechanisms to locally optimize the utilization of the frequency spectrum at a network node.

Therefore, the methods of the related art wireless communication systems cannot provide the level of flexibility required to cope with the massive number of user devices, their increasing demand for data rate and connectivity, and the densification level of radio access networks envisioned for the near future. New and improved methods and devices are required to enable the next generation of wireless communication systems to flexibly reconfigure the allocation of network resources to the network nodes to cope with variations in the traffic intensity, user device mobility, etc., thereby shifting from cell-optimization methods to network-optimization methods.

In this disclosure a wireless communication system is considered with network nodes deployed with density $\lambda_{b,dep}$ (number of network nodes per area unit) over a region of the wireless communication system serving user devices which are present in a region or a sub-region with density $\lambda_m$ (number of user devices per area unit). Associated with the network region is a traffic intensity map characterizing the traffic demand of the system user devices in the spatial domain, in time domain or a combination thereof. A point in the traffic intensity map can represent the peak or average traffic intensity associated with a portion or location of the network region, where the traffic can be intended as traffic demand from the system users or traffic load. For example, the traffic intensity map for a region or a sub-region of the system may be determined by combining traffic information from network nodes in the region. In what follows $\lambda_b$ refers to the density of network nodes for operation as the number of network nodes scheduled to be used in a region or a sub-region of the wireless communication system (e.g. NN/km$^2$) to meet the traffic load or the traffic demand of user devices present in the region or the sub-region.

Network densification can be expressed through various metrics:

The access-node density per unit area $\lambda_b$=N/A [NN/m$^2$], yielding the number N of network nodes (NN) in an area A directly corresponding to a region, i.e., the density of the radio access network (RAN) infrastructure deployed by an operator;

The user device (UD) density per unit area: $\lambda_m$=M/A [UD/m$^2$], yielding the number M of user devices per area, i.e., the density of the user devices in a certain geographical region at a given time instance, thereby representing in some sense the traffic distribution or the system resource demand distribution per area unit;

The network node density $\lambda_n$=N/M [NN/UD], yielding the number of network nodes per user devices per area unit.

It is clear to the person skilled in the art that the aforementioned definitions can be equivalently extended to other area unit scaling, such as e.g. km$^2$. For a given metric, the density values associated to different geographical areas of a network deployments can be compactly represented by a network density map.

To meet the above mentioned and further objectives embodiments of the present disclosure relate to a first network node and a second network node, and to methods thereof.

Figure 1:
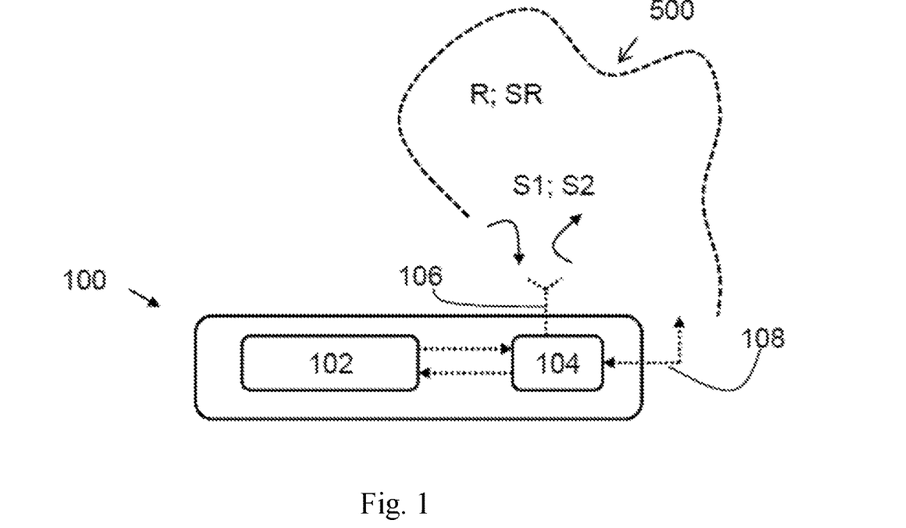
FIG. 1 shows a first network node according to an embodiment of the present disclosure.

FIG. 1 shows an embodiment of a first network node 100 according to the present disclosure. The first network node 100 comprises a processor 102 and a transceiver 104. The transceiver 104 is in this particular example coupled to an antenna unit 106 for wireless communication and/or a wired connection 108 for wired communication. The transceiver 104 is configured to receive a first signal S1 comprising a network information message by means of the antenna unit 106 and/or the wired communication connection 108. The network information message indicates, according to the present solution, network information associated with a region R or with at least one sub-region SR of the region R.

The transceiver 104 of the first network node 100 is further configured to forward the received network information message to the processor 102, and hence the processor 102 and the transceiver 104 are communicably coupled to each other with suitable communication means (known in the art). The communication means are illustrated with the two arrows between the processor 102 and the transceiver 104 in FIG. 1.

The processor 102 is configured to receive the network information message and is configured to determine a density of network nodes for operation $\lambda_b$ in the region R or in the sub-region SR based on the received network information. The density of network nodes for operation $\lambda_b$ is forwarded by the processor 102 to the transceiver 104. The transceiver 104 is further configured to transmit a second signal S2 to one or more second network nodes associated with the region R or with the sub-region SR. According to the present solution the second signal S2 comprises a first network resource allocation message indicating the density of network nodes for operation $\lambda_b$ determined by the processor 102.

The first network node 100 may e.g. be a control network node or an access node or a combination thereof. In one example the first network node 100 refers to a network control node such as a NodeB or enhanced NodeB (eNodeB) that coordinates or controls one or more other network nodes with limited computational capabilities, such as radio access nodes, pico-cell nodes, small-cell nodes, femto-cell nodes, relay nodes, remote radio head (RRH) nodes, etc. In an alternative example, the first network node 100 refers to a network node in a group of network nodes of the same or similar kind elected to control and/or coordinate the operation of a cluster of network nodes, such as radio access nodes, pico-cell nodes, small-cell nodes, femto-cell nodes, etc.

Figure 2:
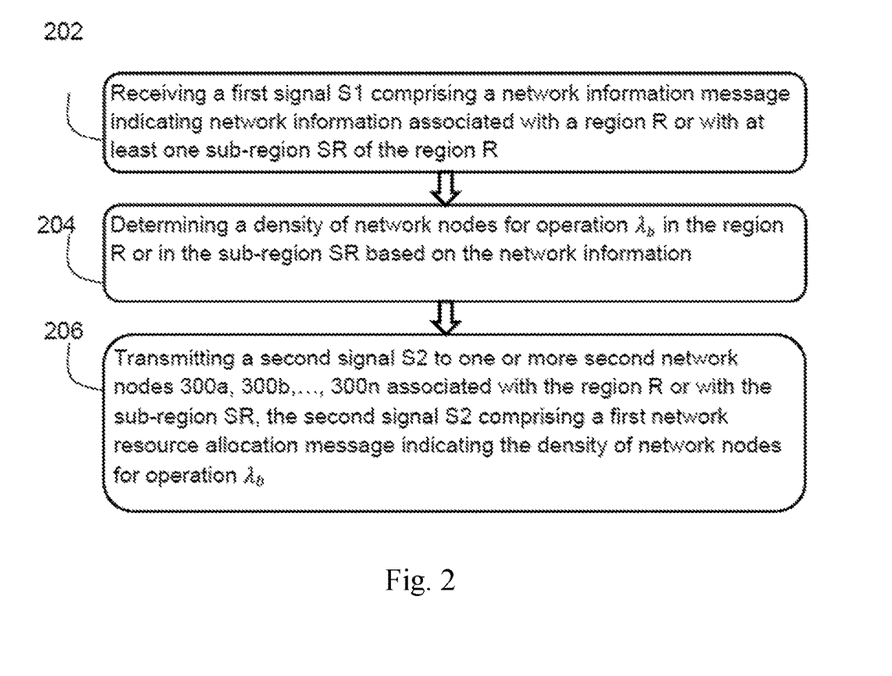
FIG. 2 shows a method according to an embodiment of the present disclosure.

FIG. 2 shows a corresponding method 200 which in this example is executed in a first network node 100 as shown in FIG. 1. The method 200 comprises the step 202 of receiving a first signal S1 comprising a network information message indicating network information associated with a region R or with at least one sub-region SR of the region R. The method further comprises the step 204 of determining a density of network nodes for operation $\lambda_b$ in the region R or in the sub-region SR based on the received network information. The method further comprises the step 206 of transmitting a second signal S2 to one or more second network nodes 300a, 300b, ..., 300n associated with the region R or with the sub-region SR, the second signal S2 comprising a first network resource allocation message indicating the density of network nodes for operation $\lambda_b$.

In an embodiment of the present disclosure the first network node 100 is further configured to determine an operational state of the one or more second network nodes 300a, 300b, ..., 300n based on the density of network nodes for operation $\lambda_b$. Therefore, according to this embodiment the first network resource allocation message (which is transmitted to the second network node 300) further indicates the determined operational state of the one or more second network nodes 300a, 300b, ..., 300n.

Figure 3:
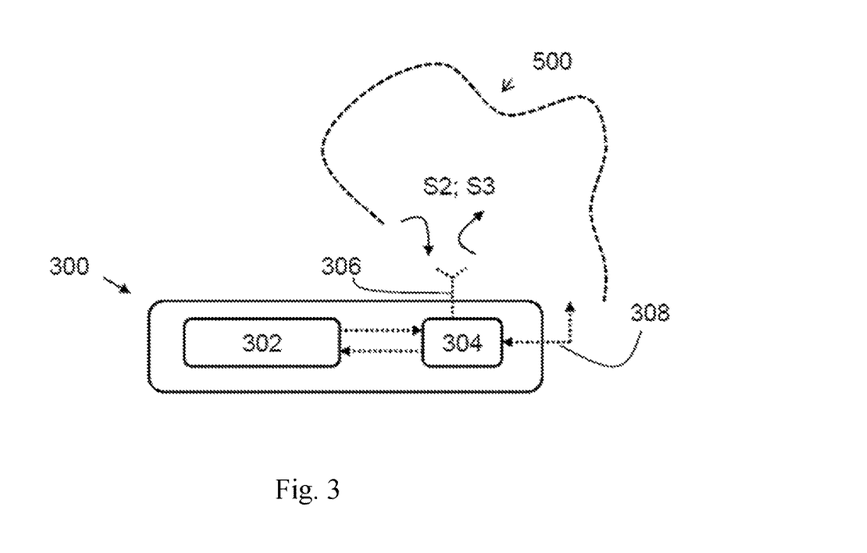
FIG. 3 shows a second network node according to an embodiment of the present disclosure.

Furthermore, FIG. 3 shows an embodiment of such a second network node 300 according to the present disclosure. Also the second network node 300 comprises a processor 302 and a transceiver 304. The transceiver 304 is in this particular example coupled to an antenna unit 306 for wireless communication and/or a wired connection 308 for wired communication. The transceiver 304 is configured to receive the second signal S2 comprising the density of network nodes for operation $\lambda_b$ in a region R or in at least one sub-region SR of the region R to which the second network node 300 is associated. The density of network nodes for operation $\lambda_b$ is thereafter forwarded by the transceiver 304 to the processor 302. The processor 302 of the second network node 300 is configured to: control an operational state of the second network node 300 and/or determine an operational state of one or more other second network nodes 300a, 300b, ..., 300n in the region R or the sub-region SR. For the latter case the transceiver 304 is further configured to transmit a third signal S3 to the one or more other second network nodes 300a, 300b, ..., 300n, wherein the third signal S3 comprises a second network resource allocation message indicating the operational state for the 300a, 300b, ..., 300n other second network nodes.

Figure 4:
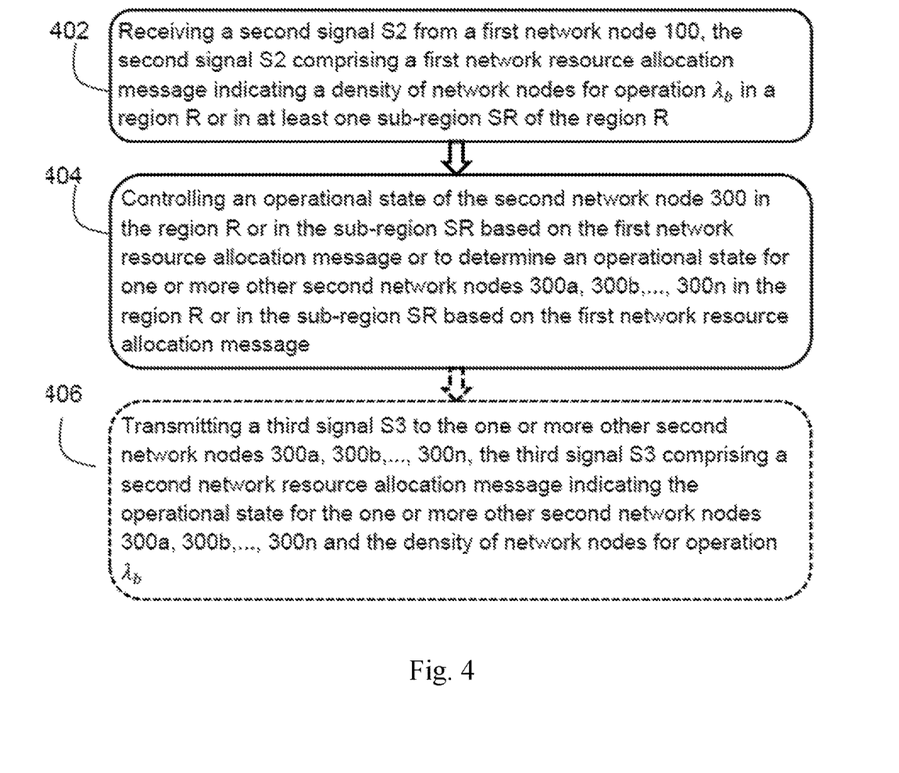
FIG. 4 shows another method according to an embodiment of the present disclosure.

FIG. 4 shows a corresponding method 400 which in this example is executed in a second network node 300 such as the one shown in FIG. 3. The method comprises the step 402 of receiving the second signal S2 from the first network node 100. The second signal S2 comprises the first network resource allocation message. The method further comprises the step 404 of controlling an operational state of the second network node 300 based on the first network resource allocation message and/or to determine an operational state for one or more other second network nodes 300a, 300b, ..., 300n based on the first network resource allocation message. The method further comprises the step 406 (shown with dashed lines) of transmitting a third signal S3 to the one or more other second network nodes 300a, 300b, ..., 300n if the operational state for one or more other second network nodes is determined in the previous step 404 or received in the previous step 402. The third signal S3 comprises a second network resource allocation message indicating the operational state for the one or more other second network nodes 300a, 300b, ..., 300n and the density of network nodes for operation $\lambda_b$.

Therefore, given the available network resources in a region R or a sub-region SR, such as the deployed density of network nodes (e.g. NN/km$^2$) and/or the available frequency resources (e.g., frequency band), and given the needs of the wireless communication system in the region R or the sub-region SR, represented for instance by the average or peak data rate to be supplied per user device, the total traffic load, etc., the present solution discloses devices and methods to schedule the network resources in the form of density of network nodes for operation $\lambda_b$, radio frequency resources for operation of network nodes, and operational state for operation of network nodes to be used by one or more second network nodes in the region R or the sub-region SR to supply the traffic demand or traffic load in the system.

Figure 5:
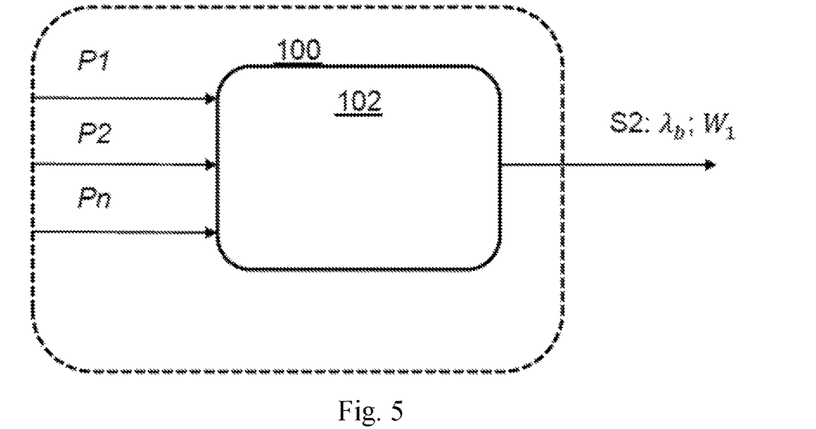
FIG. 5 illustrates a further first network node according to a further embodiment of the present disclosure.

FIG. 5 shows a further embodiment of a first network node 100 according to the present disclosure in which both a density of network nodes for operation $\lambda_b$ and a first allocation of frequency resources for operation $W_1$ in the region R or in the sub-region SR are determined by the processor 102 based on the received network information. FIG. 5 further shows how the first network resource allocation message in the second signal S2 indicates the density of network nodes for operation $\lambda_b$ and the first allocation of frequency resources for operation $W_1$. The second network node 300 is therefore in turn configured to operate according to the first allocation of frequency resources for operation $W_1$, meaning that the transceiver 304 is configured to operate in the first allocation of frequency resources for operation $W_1$ or according to first allocation of frequency resources for operation $W_1$.

Thereby, the first network node 100 may exploit models defining the coupling between radio network density and frequency resources to determine an optimal trade-off between using more frequency resources (e.g., bandwidth) or more network nodes to serve a certain traffic demand or traffic load in a region R or sub-region SR of the wireless communication system 500.

According to an embodiment of the present disclosure the first allocation of frequency resources for operation $W_1$ indicates one or more in the group comprising: amount of frequency bandwidth, frequency location of frequency bandwidth, a set of time-frequency resource blocks, one or more frequency bands, instruction to increase or decrease frequency bandwidth, and instruction to increase or decrease frequency bandwidth by a predefined amount.

Therefore, a second network node 300 may be instructed or configured with the exact amount and location in the frequency domain of the frequency bandwidth to utilize to communicate with the system's user devices. In alternative, a second network node 300 may be instructed to increase or decrease the amount of frequency bandwidth utilized within one or more frequency bands. In this case, the second network node 300 may either autonomously determine an increase or decrease factor and its frequency location, respectively, (for instance, by utilizing pre-defined tables) or it may further be instructed with an increase or decrease factor and its frequency location. In one example, the increase or decrease factor may be chosen among a set of step-sizes known at the second network node 300.

FIG. 5 also illustrates that one or more parameters P1, P2, ..., Pn may be used as input parameters for determining the density of network nodes for operation $\lambda_b$ and/or the first allocation of frequency resources for operation $W_1$. Mentioned one or more parameters P1, P2, ..., Pn are according to an embodiment related to network traffic information or network environment information of the received network information.

Therefore, the network information is according to an embodiment one or more in the group comprising:
Traffic load,
Traffic demand,
Average traffic load or traffic demand,
Peak traffic load or traffic demand,
Time distribution of traffic load or traffic demand,
Spatial distribution of traffic load or traffic demand,
User device 600 density, active user device 600 density, traffic demand of active user devices 600a, 600b, ..., 600n,
Available density of network nodes,
Available frequency spectrum resources at network nodes, and
An estimate of a radio propagation loss exponent.

Traffic load and traffic demand represent the amount of data to be supplied to and requested by the user devices, respectively. Typically, these parameters are expressed in [bit/sec]. However, when referred to a traffic map, the one or more parameters P1, P2, ..., Pn can be given per unit area, such as traffic demand or traffic load per unit area [bit/sec/km$^2$]. The average traffic load or traffic demand may represent an average over time, over space or a combination thereof. The spatial distribution of traffic load or traffic demand represents the spatial correlation of the parameters. The density of user devices gives the number of user devices per unit area, whilst the available density of network nodes represents the number of network nodes deployed per unit area in the wireless communication system. The available frequency resources at network nodes can represent the frequency bands that the network nodes can operate with, the amount of frequency bandwidth per frequency band available at the network nodes, the number of component carriers, radio access technologies (RATs) available at the network nodes. Overall, this parameter can be expressed in terms of a frequency spectrum budged representing the overall frequency bandwidth available at network nodes. Finally, an estimate of a radio propagation loss exponent, also known as path-loss exponent, represents the distance dependent attenuation factor for a given region R or sub-region SR of the wireless communication system 500. Typical values of the propagation loss exponent are: 2 in free-space wireless communication; 3.76 for rural environment; and above 4 urban areas or indoor environments.

Mentioned one or more parameters P1, P2, ..., Pn may be used as input parameters for determining and characterising traffic and resource utilisation:
Aggregate or average user device 600 rate performance,
Average service (or packet) delivery delay to or from user devices 600a, 600b, ..., 600n,
Average packet or average block error rate,
Hybrid automatic repeat request or automatic repeat request retransmission attempts,
Change in user device 600 traffic demand, and
User device 600 performance metrics.

The average user device rate represents the average rate of successful data delivery over a communication channel. The user device rate is usually measured in bits per second (bit/s or bps), and sometimes in data packets per second or data packets per time slot. The aggregate user device rate is the sum of the user device rates that are delivered to or from all user devices in a network. The average service (or packet) delivery delay represents the average amount of time required to deliver data (or data packet) to or from a user device. The average packet error rate or block error rate is the ratio of the number of erroneous packets or blocks to the total number of packets or blocks received by a user device. The automatic repeat request retransmission is a forward error control mechanism in which incorrectly received coded data packets or blocks are retransmitted. The hybrid automatic repeat request retransmission is another forward error control mechanism in which transmitted and re-transmitted packets or blocks are stored and combined at the receiver rather than discarded. Changes in user device traffic demand and user device performance metrics represent changes in the amount of data requested by the user devices and the user device performance between two or more subsequent periods of time, respectively.

Figure 6:
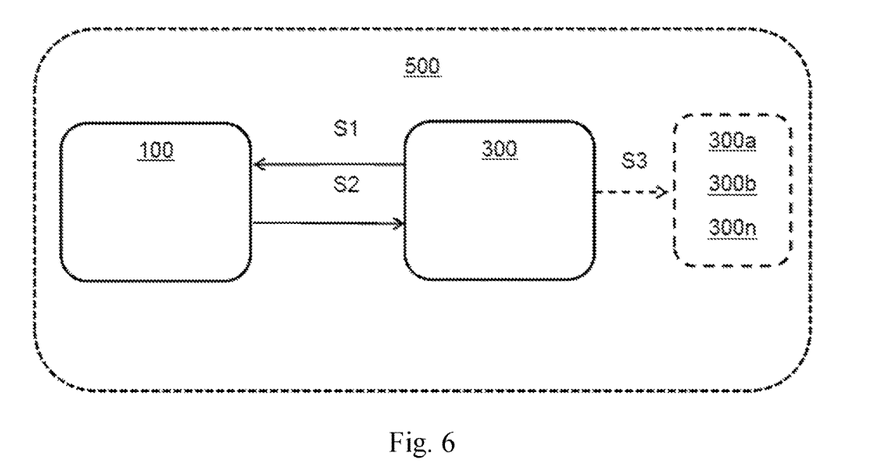
FIG. 6 illustrates information exchange between the first network node and the second network node.

Moreover, FIG. 6 illustrates information exchange between the first network node 100 and the second network node 300 and possibly or optionally other second network nodes 300a, 300b, ..., 300n in a wireless communication system 500. The second network node 300 transmits the first signal S1 to the first network node 100. The first network node 100 receives the first signal S1 (e.g. from one more second network node 300, 300a, 300b, ..., 300n), processes the first signal S1 and derives or extracts the network information in the first signal S1. Thereafter, the first network node 100 transmits a second signal S2 to the second network node 300. The second network node 300 uses the first network resource allocation message in the second signal S2 for controlling the operational state of the second network node 300, the allocation of frequency resources for operation, and/or for controlling the operational state of one or more other second network nodes 300a, 300b, ..., 300n by means of a third signal S3. It should however be noted the first signal S1 and the second signal S2 may be transmitted to the first network node 100 or to the second network node 300 by other network entities, or via network entities in the wireless communication system 500.

The frequency spectrum budget available at the second network nodes may represent the frequency spectrum bandwidth leased or owned by a network operator in a geographical region. The spectrum budget of an operator may be fixed or change over time as the result of frequency spectrum sharing or spectrum allocation among operators. The present solution also deals with how a network operator controls, by means of a first network node and/or a second network node and methods thereof according to the present disclosure, the utilization of its frequency spectrum budget in the network nodes of a region R or a sub-region SR.

Figure 7:
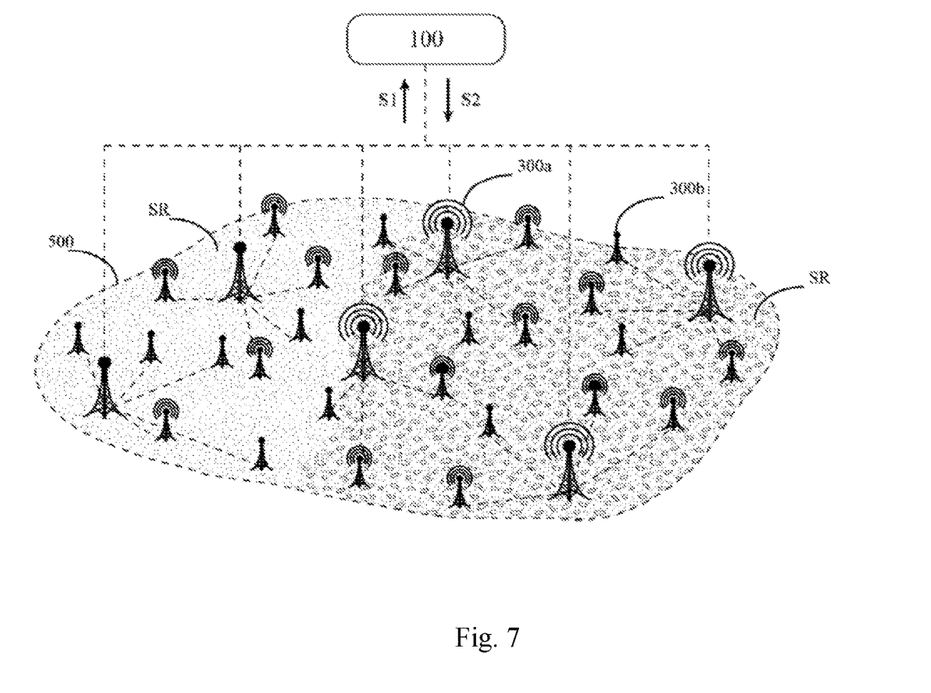
FIG. 7 gives an example of a wireless communication system according to an embodiment of the present disclosure.

An example is shown in FIG. 7, where the first network node 100 determines the density of network nodes and an allocation of frequency resources for operation for two sub-regions SRs of the wireless communication system 500 characterized by different traffic demand/load. For instance, a sub-region SR with higher traffic demand can be configured to operate with higher density of network nodes and/or more frequency resources (e.g., frequency bandwidth). Thus, the first network node 100 can control the allocation of frequency resources to network nodes for operation, and operational state of multiple second network nodes 300a, 300b, . . . , 300n in each sub-region SR, with some second network nodes 300a operate in an ON-state, and other second network nodes 300b operate in an OFF-state. In alternative, a second network node 300 in a sub-region SR can determine the operational state and an allocation of frequency resources for other second network nodes in the sub-region based on the network resource allocation message received from the first network node 100. A subset of network nodes available in a region R of the system 500 is configured to operate in an ON-state with a frequency bandwidth W so as to provide the system user devices with the requested traffic demand.

In a further embodiment of the present disclosure, the first network node 100 is further configured to determine the density of network nodes for operation $\lambda_b$ in a region R of the system 500 or a first allocation of frequency resources for operation W for the network nodes by minimizing a cost function $c_b\lambda_b + c_w W$ subject to traffic demand $t_m$ by solving the following optimization problem in the variables $\lambda_b$ and W $$\text{minimize } c_b\lambda_b + c_w W \quad (1)$$
$$\text{subject to}$$
$$t_m\lambda_m \leq \lambda_b W \log\left(1 + \left(\frac{\lambda_b}{\rho\lambda_m}\right)^{\alpha/2}\right) 0 \leq \lambda_b \leq \lambda_{b,dep},$$
$$0 \leq W \leq W_{dep},$$

through the following iterative algorithm

Step-1: Update the scheduled network node density $\lambda_b$, according to $$\lambda_b(i) = \min\left\{\lambda_{b,dep}, \frac{\mu(i-1)}{c_b}\left[1 + \frac{\alpha}{2}\frac{\left(\frac{\lambda_b(i-1)}{\rho\lambda_m}\right)^{\alpha/2}}{1 + \left(\frac{\lambda_b(i-1)}{\rho\lambda_m}\right)^{\alpha/2}}\frac{1}{\log\left(1 + \left(\frac{\lambda_b(i-1)}{\rho\lambda_m}\right)^{\alpha/2}\right)}\right]\right\}$$

Step-2: Update the scheduled frequency bandwidth W according to $$W(i) = \min\left\{W_{dep}, \frac{\mu(i-1)}{c_w}\right\}$$

Step-3: Update the auxiliary variable μ according to $$\mu(i+1) = \max\left\{0, \mu(i) + \epsilon\left[\log(t_m\lambda_m) - \log\left(\lambda_b(i)W(i)\log\left(1 + \left(\frac{\lambda_b(i)}{\rho\lambda_m}\right)^{\alpha/2}\right)\right)\right]\right\}$$

Step-4: Repeat from step-1 until convergence.
In problem (1), the term log $$\left(1 + \left(\frac{\lambda_b}{\rho\lambda_m}\right)^{\alpha/2}\right)$$

represents an estimate of the average user device spectral efficiency (e.g., in bps/Hz), $c_b$ represents the operational cost per network nodes (e.g., energy cost, base station costs, etc.), $c_w$ represents the operational cost per frequency bandwidth, α represents an estimation of the distance-dependent propagation loss decay factor, $t_m$ represents the average or peak traffic demand per active user device (e.g., bps/UD), $\lambda_{b,dep}$ represents the deployed density of network nodes per unit area (e.g., NN/km²), $W_{dep}$ represents the available maximum frequency bandwidth in the deployed network nodes,) $\lambda_m$ represents the density of active user devices per unit area (e.g., UD/km²), and ρ is a properly selected scaling coefficient that can be used. The parameter ρ can represent, for instance, spectral efficiency degradation due to inter-cell or inter-region interference at the edge of the regions. As such, the parameter ρ can be known or estimated by the first or second network node through measurements of spectral efficiency, or can be signalled to the first network node with the signal S1 as part of the network information associated with a region R or a sub-region SR of the wireless communication system.

The model utilized in problem (1) can be associated to network node deployment and user device 600 distribution following a Poisson Point Process, while the user device 600 spectral efficiency is averaged over a fast fading channel. Without loss of generality, in this problem formulation user devices can be assumed to be associated with the network node with the strongest signal strength and that network nodes perform an orthogonal user scheduling according to, for instance, a round robin scheduling policy.

In an embodiment of the present disclosure, the first network node 100 is further configured to determine a partition and/or partitioning information for the region R of the wireless communication system into K≥1 sub-regions SRs based on the network information received in the first signal S1. The partitioning information is transmitted to the second network node 300 e.g. as a partitioning message in the second signal S2.

In this respect the second network node 300 may further be configured to determine an allocation of network resources for at least a network sub-region SR comprising at least the density of $\lambda_b$ of network nodes for operation in a sub-region SR or an allocation of frequency resources $W_2$ for operation (e.g., a frequency spectrum bandwidth W) of the network nodes.

User device deployment can be modelled as a statistical modelling of spatial relationship. To this end the locations of the arriving user devices are independently and uniformly distributed (according to PPP) on the two-dimensional plane within the region R. With other words, user device traffic demands arrive on the region according to one-dimensional Poisson process of rate $\lambda$ in time. The user arrival pattern, along with, the spatial distribution constitute a space-time process given by $\lambda_m=\lambda/A$ where A is the area of the region R. In this case the traffic demand can be expressed in terms of average system traffic rate as $\lambda_m t_m$.

Alternatively, assuming that the duration of the user device session is exponentially distributed with the mean of $u_m^{-1}$, then the traffic demand/intensity (or offered load) is the total arrival traffic presented to the region R as a whole. The traffic intensity, of a region R is the product of average arrival rate of the user device and the average service time, $\lambda_m/u_m$.

Therefore, sub-regions SRs with lower intensity of traffic can be allocated with by fewer network nodes for operation or fewer frequency resources for operation (e.g., a smaller frequency spectrum bandwidth), whereas sub-regions SRs with higher intensity of traffic or higher user device density can be allocated with by more network nodes for operation or more frequency resources, as illustrated in FIG. 7.

The trade-off between the scheduled density of network nodes for operation $\lambda_b$ and the allocated frequency resources to active network nodes in a sub-region SR of the wireless communication system can be described, for instance, in terms of joint operational costs (e.g., CAPEX) or joint energy cost for the network nodes and frequency resources.

In an embodiment of the disclosure, the first network node 100 for controlling the allocation of network resources in a region R of a wireless communication system 500 determines a partition of the region into K≥1 sub-regions based on the network information, e.g. such as average traffic demand or average user density.

The maximum number of sub-regions $K_{max}$ that can be created is known at the first network node 100. In hierarchical network architecture, for instance, the maximum number of sub-regions $K_{max}$ may coincide with the number of network control nodes residing in control layer beneath the network control node that can be instructed to administrate a network sub-region SR. The number of sub-regions SR, K, can be determined to minimize a network cost function as in problem (1).

In particular, the first network node may determine the best partition of the region R by the following iterative algorithm For K=1, . . . , $K_{max}$
  Determine a spatial partition of the network region R into K sub-regions SR based on the spatial distribution of traffic demand, and let $t_{u,k}$ and $\lambda_{u,k}$ denote the resulting average traffic demand and user device density in sub-region k=1, . . . , K;
  Determine the aggregate operational cost of the network partitioning into K sub-regions SRs by aggregating the operational cost of each sub-region SR (e.g., the cost of sub-region k-th may be found solving problem (1) for $t_{m,k}$ and $\lambda_{m,k}$);
  If the operational cost of partitioning the network region into K≥2 sub-regions SRs is higher than the operational cost of partitioning the network into K−1 sub-region SR, then terminate the algorithm selecting K−1 sub-regions SRs.

In case, inter-region interference can be estimated at the border of each region by means, for instance, of radio environment measurements between network nodes or by interference measurements reports from the system user devices. This information can then be used in problem (1) to properly adjust the scaling coefficient ρ so as to account for spectral efficiency degradation due to inter-cell or inter-region interference at the edge of the regions.

There are several ways that can be used to create a spatial partition of a region R of the communication system into K≥1 sub-region SR. One method is to construct the K sub-regions SRs so as clusters formed by traffic samples with similar average values. To this end, one may consider using a K-mean algorithm that iteratively updates the location of K centroids and associates each traffic samples to one centroid so as to minimize the average cost function. In alternative one may define K sub-region, with each sub-region being characterized by range or type of traffic.

Figure 8:
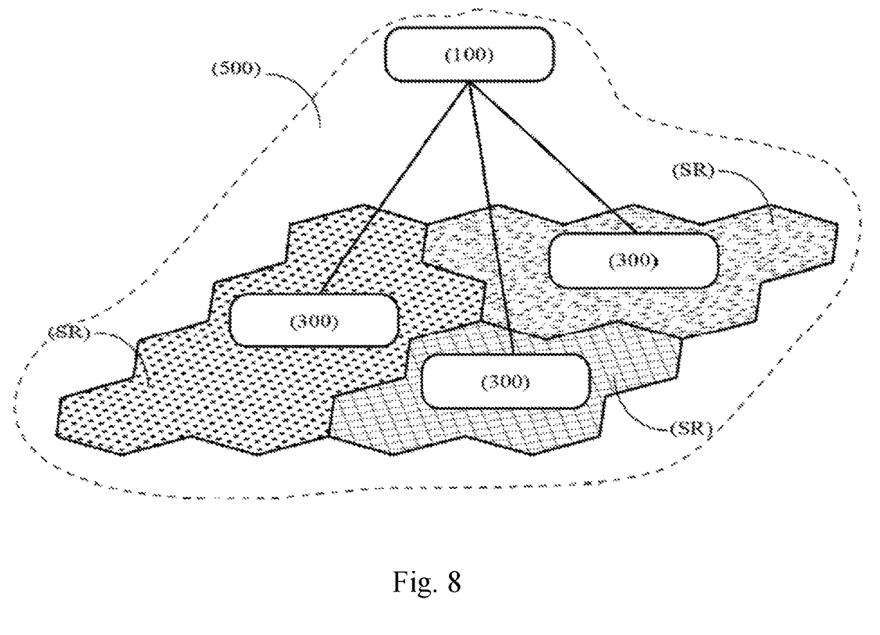
FIG. 8 illustrates a region portioned into a plurality of sub-regions according to an embodiment of the present disclosure.

FIG. 8 illustrates a region R of a wireless communication system 500 being partitioned into three sub-regions SRs by a first network node 100 based on spatial distribution of traffic load/demand. In this example, each sub-region SR is further controlled by a second network node 300 that receives allocation of network resources determined by the first network node 100.

In an embodiment of the present disclosure, the first network node 100 for controlling the allocation of resources in a region R of a wireless communication system 500 transmits partitioning information or an allocation of network resources to at least one second network node 300 in one network sub-region SR. In the example shown, the first network node 100 transmits such partitioning information or allocation of network resources to each of the second network node 300 controlling the corresponding network sub-regions SR.

In one embodiment of the present disclosure, the partitioning information transmitted by the first network node 100 to at least one second network node 300 in a network sub-region SR comprises one or more of:
  Identities of network nodes belonging to a sub-region SR,
  Identities of user devices 600a, 600b, . . . , 600n served in a sub-region SR,
  Type of traffic served in a sub-region SR,
  Spatial distribution of traffic served in a sub-region SR,
  Spatial distribution of user devices 600a, 600b, . . . , 600n in a sub-region SR,
  User device 600 density in a sub-region SR,
  Active user device 600 density in a sub-region (SR),
  Traffic demand of active user devices 600a, 600b, . . . , 600n in a sub-region SR,
  Available network node density in a sub-region SR, and
  Available frequency spectrum at network nodes in a sub-region SR.

In an embodiment of the present disclosure the processor 302 of the second network node 300 is further configured to determine a second allocation of frequency resources for operation $W_2$ in the region R or in the sub-region SR based on the first allocation of frequency resources for operation $W_1$ and on network traffic information or network environment information as mentioned before in this disclosure. Therefore, the second network resource allocation message, sent to the other second network nodes, further indicates the second frequency allocation for operation $W_2$ in this example.

The second frequency resources for operation $W_2$ may as for the first frequency resources for operation $W_1$ indicate one or more in the group comprising: amount of frequency bandwidth, frequency location of frequency bandwidth, one or more frequency bands, instruction to increase or decrease frequency bandwidth, and instruction to increase or decrease frequency bandwidth by a predefined amount.

Furthermore, any method according to the present disclosure may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present first network node and second network node comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present disclosure is not limited to the embodiments described above, but also relates to and incorporates all embodiments within the scope of the appended independent claims.

What is claimed is:

1. A first network node for a wireless communication system, the first network node comprising:
   a processor; and
   a transceiver;
   wherein the transceiver is configured to receive a first signal comprising a network information message indicating network information associated with a region (R) or with at least one sub-region (SR) of the region (R);
   wherein the processor is configured to determine a density of network nodes for operation $\lambda_b$ in the region (R) or in the sub-region (SR) based on the network information;
   wherein the transceiver further is configured to transmit a second signal to one or more second network nodes associated with the region (R) or with the sub-region (SR), the second signal comprising a first network resource allocation message indicating the density of network nodes for operation $\lambda_b$; and
   wherein the processor is further configured to partition the region (R) into K≥1 number of sub-regions (SR) based on the network information so as to determine partitioning information, and wherein the second signal further comprises a partitioning message indicating the partitioning information.

2. The first network node according to claim 1, wherein the processor is further configured to:
   determine an operational state for the one or more second network nodes based on the density of network nodes for operation $\lambda_b$; and
   wherein the first network resource allocation message further indicates the operational state for the one or more second network nodes.

3. The first network node according to claim 1, wherein the network information is one or more network traffic information or network environment information in the group comprising: traffic load, traffic demand, average traffic load or traffic demand, peak traffic load or traffic demand, time distribution of traffic load or traffic demand, spatial distribution of traffic load or traffic demand, user device density, active user device density, traffic demand of active user devices, available density of network nodes, available frequency spectrum resources at network nodes, and an estimate of a radio propagation loss exponent.

4. The first network node according to claim 3, wherein the network information further is one or more in the group comprising: aggregate or average user device rate performance, average service delivery delay to or from user devices, average packet or average block error rate, hybrid automatic repeat request or automatic repeat request retransmission attempts, change in user device traffic demand, and user device performance metric.

5. The first network node according to claim 1, wherein the processor is further configured to:
   determine a first allocation of frequency resources for operation $W_1$ in the region (R) or in the sub-region (SR) based on the network information; and
   wherein the first network resource allocation message further indicates the first allocation of frequency resources for operation $W_1$.

6. The first network node according to claim 5, wherein the first allocation of frequency resources for operation $W_1$ indicates one or more in the group comprising: amount of frequency bandwidth, frequency location of frequency bandwidth, a set of time-frequency resource blocks, one or more frequency bands, instruction to increase or decrease frequency bandwidth, and instruction to increase or decrease frequency bandwidth by a predefined amount.

7. The first network node according to claim 1, wherein the partitioning information is one or more in the group comprising: identities of network nodes belonging to a sub-region (SR), identities of user devices served in a sub-region (SR), type of traffic served in a sub-region (SR), spatial distribution of traffic served in a sub-region (SR), spatial distribution of user devices in a sub-region (SR), user device density in a sub-region (SR), active user device density in a sub-region (SR), traffic demand of active user devices in a sub-region (SR), available network node density in a sub-region (SR), and available frequency spectrum at network nodes in a sub-region (SR).

8. A second network node for a wireless communication system, the second network node comprising:
   a processor; and
   a transceiver;
   wherein the transceiver is configured to receive a second signal from a first network node, wherein the second signal comprises a partitioning message indicating partitioning information, and wherein the second signal includes a first network resource allocation message indicating a density of network nodes for operation $\lambda_b$ in a region (R) or in at least one sub-region (SR) of the region (R), and wherein the region (R) is partitioned into K≥1 number of sub-regions (SR);

wherein the processor is configured to control an operational state of the second network node in the region (R) or in the sub-region (SR) based on the first network resource allocation message or to determine an operational state for one or more other second network nodes in the region (R) or in the sub-region (SR) based on the first network resource allocation message; and wherein the transceiver further is configured to transmit a third signal to the one or more other second network nodes, the third signal comprising a second network resource allocation message indicating the operational state for the one or more other second network nodes and the density of network nodes for operation $\lambda_b$.

9. The second network node according to claim 8,
wherein the first network resource allocation message further indicates a first allocation of frequency resources for operation $W_1$ in the region (R) or in the sub-region (SR), and wherein the transceiver further is configured to operate according to the first allocation of frequency resources for operation $W_1$.

10. The second network node according to claim 9, wherein the processor is further configured to:
determine a second allocation of frequency resources for operation $W_2$ in the region (R) or in the sub-region (SR) based on the first allocation of frequency resources for operation $W_1$ and on network traffic information or network environment information; and wherein the second network resource allocation message further indicates the second frequency allocation for operation $W_2$.

11. The second network node according to claim 10, wherein the second allocation of frequency resources for operation $W_2$ indicates one or more in the group comprising: amount of frequency bandwidth, frequency location of frequency bandwidth, a set of time-frequency resource blocks, one or more frequency bands, instruction to increase or decrease frequency bandwidth, and instruction to increase or decrease frequency bandwidth by a predefined amount.

12. The second network node according to claim 8, wherein the transceiver is further configured to:
transmit a first signal to the first network node, the first signal comprising a network information message indicating network information associated with the region (R) or with the sub-region (SR).

13. The first network node according to claim 1, wherein the density of network nodes for operation $\lambda_b$ is given in number of network nodes per area unit.

14. A method in a first network node for a wireless communication system, the method comprising:
receiving a first signal comprising a network information message indicating network information associated with a region (R) or with at least one sub-region (SR) of the region (R);

determining a density of network nodes for operation $\lambda_b$ in the region (R) or in the sub-region (SR) based on the network information;

transmitting a second signal to one or more second network nodes associated with the region (R) or with the sub-region (SR), the second signal comprising a first network resource allocation message indicating the density of network nodes for operation $\lambda_b$; and partitioning the region (R) into K≥1 number of sub-regions (SR) based on the network information so as to determine partitioning information, wherein the second signal further comprises a partitioning message indicating the partitioning information.

15. A method in a second network node for a wireless communication system, the method comprising:
receiving a second signal from a first network node, wherein the second signal further comprises a partitioning message indicating the partitioning information, wherein the second signal includes a first network resource allocation message indicating a density of network nodes for operation $\lambda_b$ in a region (R) or in at least one sub-region (SR) of the region (R), and wherein the region (R) is partitioned into K≥1 number of sub-regions (SR);

performing one or more of:
controlling an operational state of the second network node based on the first network resource allocation message, or determining an operational state for one or more other second network nodes in the region (R) or in the sub-region (SR) based on the first network resource allocation message, and transmitting a third signal to the one or more other second network nodes, the third signal comprising a second network resource allocation message indicating the operational state for the one or more other second network nodes and the density of network nodes for operation $\lambda_b$.

16. A non-transitory computer readable medium storing a computer program with a program code that, when executed by a processor, performs the method according to claim 14.

17. The second network node according to claim 8, wherein the density of network nodes for operation $\lambda_b$ is given in number of network nodes per area unit.

* * * * *